J. G. FOSTER.
AUTOMATIC SAW SHARPENER.
APPLICATION FILED APR. 3, 1917.
1,256,782.
Patented Feb. 19, 1918.
2 SHEETS—SHEET 1.
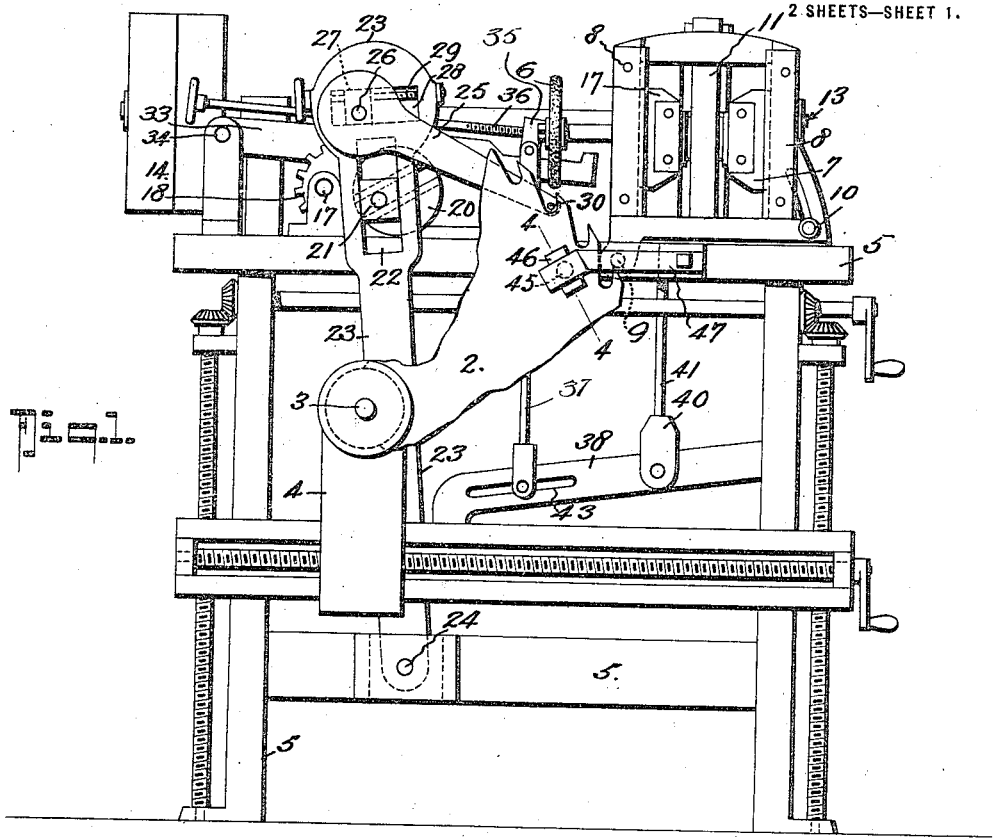
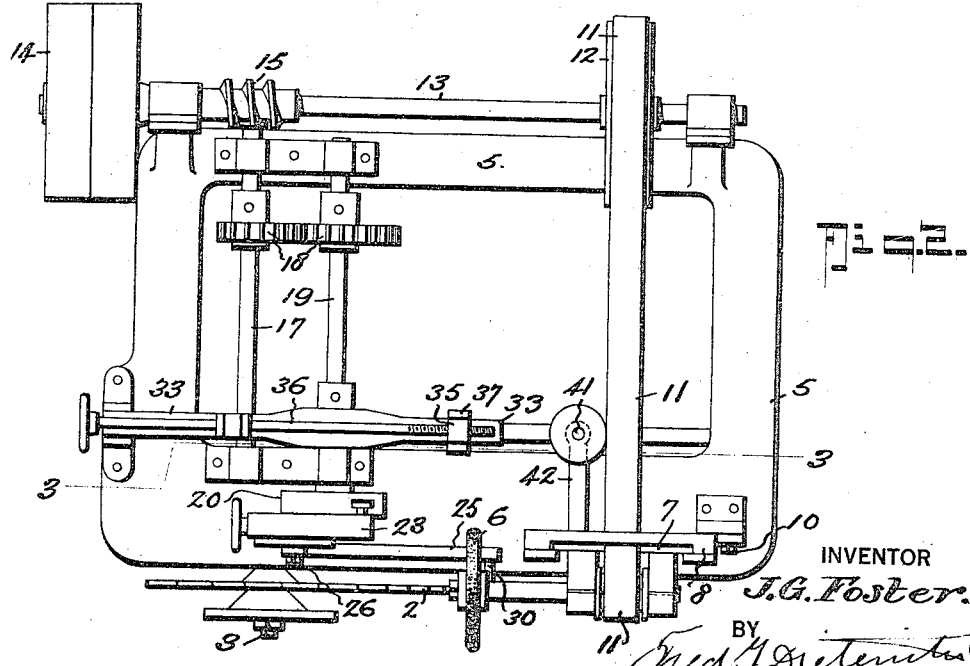
INVENTOR
J. G. Foster.
BY
Fred J. Dieterich
ATTORNEYS J. G. FOSTER.
AUTOMATIC SAW SHARPENER.
APPLICATION FILED APR. 3, 1917.
1,256,782.
Patented Feb. 19, 1918.
2 SHEETS—SHEET 2.
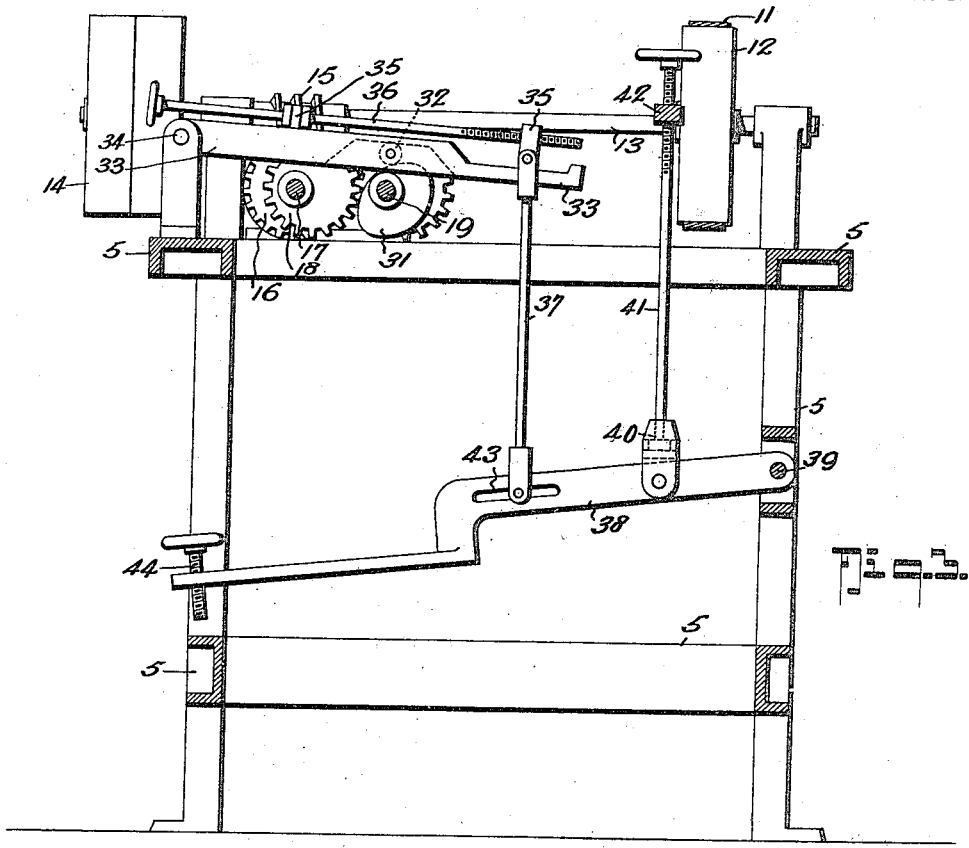
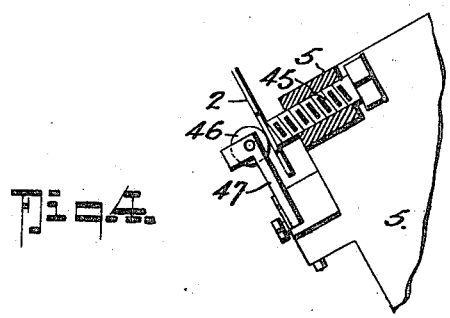
INVENTOR
J. G. Foster.
BY
Fred G. Dieterich & Co.
ATTORNEYS

UNITED STATES PATENT OFFICE.

JAMES G. FOSTER, OF VANCOUVER, BRITISH COLUMBIA, CANADA.

AUTOMATIC SAW-SHARPENER.

1,256,782.  Specification of Letters Patent.  Patented Feb. 19, 1918.

Application filed April 3, 1917. Serial No. 159,403.

*To all whom it may concern:*

Be it known that I, JAMES G. FOSTER, a citizen of the Dominion of Canada, residing at Vancouver, in the Province of British Columbia, Canada, have invented certain new and useful Improvements in Automatic Saw-Sharpeners, of which the following is a specification.

This invention relates to a saw sharpener and gummer, the improvements being directed to the provision of a simple mechanism, operated from the first motion shaft of the machine from which the rotation of the emery wheel spindle is derived, by which mechanism, while the saw is fed tooth by tooth, the emery wheel is simultaneously moved, the movements of the emery wheel and the saw feed being so correlated that the back and tops of the teeth are ground while the saw is being fed, and while the saw is stationary the emery wheel is moved to grind the cutting face and gullet. Ample means is also provided for adjustment of the various feed movements.

The invention is particularly described in the following specification, reference being made to the drawings by which it is accompanied, in which:

Figure 1 is a face elevation of the machine.

Fig. 2 is a plan of the same.

Fig. 3 is a vertical elevation of the feed mechanism being a section on the line 3—3 in Fig. 2.

Fig. 4 is a detail section on the line 4—4 in Fig. 1 showing the saw blade support against the action of the emery wheel.

The drawings show the application of the machine to effect the grinding of a circular saw 2 which is secured on a conical arbor rotatably mounted in any suitable manner on a pivot pin 3, that it may be rotated thereon as required against a frictional resistance. The member 4 in which the pivot pin 3 is secured is connected to the frame 5 of the machine in a manner permitting of horizontal and vertical adjustment of its position, that the perimeter of the saw plate of any desired diameter may be set in any required relation to the emery wheel 6 by which the teeth of the saw are to be ground.

The spindle of the emery wheel 6 is mounted in bearings in a member 7, which is vertically movable in a bracket 8 pivoted at 9 to the frame 5 of the machine and adjustably secured at 10 in a curved slot permitting angular adjustment of the plane of rotation of the wheel 6 on the pivot 9. The emery wheel spindle is rotated by a belt 11 from a pulley 12 secured on a countershaft 13 (which forms the first motion shaft of the machine) mounted in bearings at the back of the machine, which countershaft is rotated from any convenient source of power by a belt over the pulleys 14.

The feed mechanisms by which the saw is moved, tooth by tooth, to the emery wheel and simultaneously that the wheel is lifted and lowered to follow the conformation of the teeth, are driven from the same countershaft 13 by a worm 15 secured on it, which worm meshes in the teeth of a worm wheel 16 secured on a feed countershaft 17 rotatable in bearings across the machine at right angles to the countershaft 13. This feed countershaft 17 is thus driven at a relatively slow but uniform speed. The required variable movement of the feed is derived from this shaft 17 by eccentric gears 18 secured respectively on it and on the feed shaft 19 rotatably mounted parallel to it.

On the front end of this shaft 19 is secured a crank disk 20 slotted to permit adjustment of its crank pin 21 across the face of the disk, and on this pin 21 is mounted a die block which is endwise movable in a slot 22 in a lever 23 pivoted at 24 to the lower part of the frame 5 of the machine, that it may oscillate under the action of the crank pin in a plane parallel to that of the saw 2 mounted on the arbor pin 3.

The feed link 25 by which the saw blade is rotated tooth by tooth as required, is pivotally mounted on a pin 26 secured in a die block 27 which is endwise adjustable in a slot 28 across the upper end of the lever 23. The adjustment of this die block to vary the reach of the feed link 25 is attained by a screw 29 parallel to the slot and threaded through the die block 27 as through a nut. The screw being prevented endwise movement, rotation of it by the small hand wheel provided will endwise move the die block. A pin 30 projects from the end of the feed link 25 to engage the teeth of the saw and move it tooth by tooth as required. The eccentricity of the gears gives a slower movement to the feed link as the saw is being rotated and the emery wheel 6 is grinding the back of the tooth, and a quicker movement as the feed link returns for a fresh tooth during which period of return the saw remains stationary while the emery wheel is moved down to grind the cutting face and gullet of the tooth.

The required rising and falling movement of the emery wheel in its sliding in the bracket 8 is derived from the same shaft 19 which operates the saw feed. On this shaft 19 adjacent the front of the machine is secured an eccentric cam 31 on the upper side of which rests a roller 32 mounted in a lever 33 pivoted on a pin 34 in an attachment to the upper side of the frame 5 farther from the emery wheel 6. On the free end of this lever is a die block 35 endwise adjustable on the lever by a screw 36 which is produced toward the pivot 34 and provided with a hand wheel, so that adjustment may be made while the machine is running. To this die block 35 is connected a rod 37, the lower end of which is connected to a pin in an elongated slot 43 in a lever 38 pivoted at 39 to the frame 5 of the machine and to this lever intermediate of the pivot 39 and the rod 37 is connected a jaw member 40 in which is rotatably mounted the lower end of a screw 41, the upper end of which is threaded as a nut into a member 42 secured to and rearwardly projecting from the member 7 which carries the bearings of the emery wheel spindle.

By this means the emery wheel rises and falls to give the required contour to the saw tooth and its movement is correlated to the feed movement of the saw and may be varied to suit the shape of the teeth by the outline form of the cam, its angular position on the shaft 19 and by the several adjustments in the position of the die block 35 on the lever.

A screw 44 is threaded into the produced end of the lever 38 by which downward movement of that lever and consequently of the emery wheel is limited by contact of the end of the screw with the cross member of the frame 5.

To support the saw blade under the action of the emery wheel a screw 45 is threaded through the frame 5 adjacent the emery wheel, the end of which screw may be adjusted to bear against the plane of the blade, and a roller 46 carried on the end of an arm 47 secured to the outer side of the frame is adapted to exercise a resilient pressure on the opposite side of the blade to hold it against the end of the screw 45.

A simple and adaptable mechanism is thus provided for the grinding or sharpening of the teeth of a saw and affords an effective means for automatically grinding the backs, the faces and the gullets of the tooth. Although described and illustrated as applied to a circular saw, it is obvious that the same mechanism is applicable to grind the teeth of any saw. If applied to a band or straight blade saw, the blade will be passed across the face of the machine between rollers or cleats which will oppose a suitable frictional resistance to the feed movement.

I am aware that this application reveals nothing new in the manner of adjustably mounting the saw arbor on the frame of the machine nor in the manner of mounting the grinding wheel that its axis is susceptible of vertical movement in the plane of the saw blade. I am also aware that the manner of oscillating the feed link to move the saw tooth by tooth to the grinding wheel is practically the same as in other machines at present on the market. But I believe the novel features of the machine to be the means for simultaneously operating the saw feed and the movement of the grinding wheel spindle from the same feed shaft, and secondly by imparting a variable speed to the feed shaft from which the movements of the saw feed and emery wheel spindle are derived.

There are also other incidental features in the mechanism tending to simplify the machine and avoid lost movement.

Having now particularly described my invention, I hereby declare that what I claim as new and desire to be protected in by Letters Patent, is:

1. A saw sharpening machine, comprising the combination within a suitable frame, of means for supporting a saw blade thereon against lateral movement while permitting endwise movement in the line of the teeth, a grinding wheel rotatably mounted with its axis in the approximate plane of the saw blade the spindle of which wheel is susceptible of being raised and lowered in that plane, a first motion shaft, means for rotating the grinding wheel from the first motion shaft of the machine, a feed shaft driven at a reduced rate of speed from the first motion shaft, a second feed shaft driven at a variable speed from the first feed shaft, and means for feeding the saw tooth by tooth to the emery wheel from the variable feed shaft and for simultaneously raising and lowering the emery wheel operative from the shaft.

2. A saw sharpening machine, comprising the combination within a suitable frame, of means for supporting a saw blade thereon against lateral movement while permitting endwise movement in the line of the teeth, a grinding wheel rotatably mounted with its axis in the approximate plane of the saw blade, the spindle of which wheel is susceptible of being raised and lowered in that plane, a first motion shaft, means for rotating the grinding wheel from the first motion shaft of the machine and coöperatively feeding the saw tooth by tooth to the emery wheel, said means comprising a feed shaft driven at a reduced rate of speed from the first motion shaft which drives the grinding wheel, a second feed shaft driven by eccentric gears at a variable speed from the first feed shaft, means for raising and lowering the grinding wheel spindle by mechanism derived from the variable speed shaft, and means for feeding the saw tooth by tooth to the emery wheel by mechanism derived from the same shaft.

3. A saw sharpening machine, comprising the combination within a suitable frame, of means for supporting a saw plate thereon against lateral movement while permitting endwise movement in the line of the teeth, a grinding wheel rotatably mounted with its axis in the approximate plane of the saw plate, the spindle of which emery wheel is susceptible of being raised and lowered in that plane, a first motion shaft, means for rotating the grinding wheel from the first motion shaft of the machine, means for raising and lowering the emery wheel spindle, said means comprising a feed shaft driven at a reduced rate of speed from the first motion shaft which drives the grinding wheel spindle, a parallel shaft driven by eccentric gears from the feed shaft at a variable rate of speed, a cam secured on the variable speed shaft, and means whereby the variable eccentric movement of the cam may be applied to raise and lower the grinding wheel spindle, a crank having an adjustable throw secured on the variable speed shaft, and means for connecting the crank pin to feed the saw blade tooth by tooth to the emery wheel.

4. A saw sharpening machine, comprising the combination within a suitable frame, of means for supporting a saw blade thereon against lateral movement while permitting endwise movement in the line of the teeth, a grinding wheel rotatably mounted with its axis in the approximate plane of the saw blade, the spindle of which wheel is susceptible of being raised and lowered in that plane, a first motion shaft, means for rotating the grinding wheel from the first motion shaft of the machine, a feed shaft at right angles to the first motion shaft and driven at a reduced rate of speed therefrom, a crank having an adjustable throw secured on the feed shaft, a lever pivotally mounted in the frame of the machine, said lever having a slot, a die block endwise movable in said slot, said crank having a crank pin which fits said die block, means for connecting the upper end of said lever to a gullet of the saw to feed the saw tooth by tooth under the grinding wheel, and means for raising and lowering the emery wheel operable from the same feed shaft.

5. A saw sharpening machine, comprising the combination within a suitable frame, of means for supporting a saw blade thereon against lateral movement while permitting endwise movement in the line of the teeth, a grinding wheel rotatably mounted with its axis in the approximate plane of the saw blade, the spindle of which wheel is susceptible of being raised and lowered in that plane, a first motion shaft means for rotating the grinding wheel from the first motion shaft of the machine, a feed shaft at right angles to the first motion shaft and driven at a reduced rate of speed therefrom, a crank having an adjustable throw secured on the feed shaft, means for connecting the pin of the crank to a gullet of the saw teeth to feed the saw tooth by tooth under the grinding wheel, an eccentric cam secured on the feed shaft, a lever fulcrumed to the frame of the machine and horizontally disposed to bear on the upper side of the cam, a second lever fulcrumed to the machine, means adjustable on the end of the first mentioned lever for connecting it to said second lever, and means for adjustably connecting said second lever to raise and lower the grinding wheel spindle.

In testimony whereof I affix my signature.

JAMES G. FOSTER.

Copies of this patent may be obtained for five cents each, by addressing the "Commissioner of Patents. Washington, D. C."